United States Patent [19]
Gfeller

[11] Patent Number: 5,150,437
[45] Date of Patent: Sep. 22, 1992

[54] ELECTRO-OPTICAL SCANNER

[75] Inventor: Fritz Gfeller, Rüschlikon, Switzerland

[73] Assignee: International Business Machines Corporation, Armonk, N.Y.

[21] Appl. No.: 806,943

[22] Filed: Dec. 11, 1991

[30] Foreign Application Priority Data

Feb. 25, 1991 [CH] Switzerland ............ 90810990

[51] Int. Cl.⁵ .................................. G02B 6/00
[52] U.S. Cl. ....................... 385/7; 250/227.24
[58] Field of Search ............ 385/7, 8, 88, 130; 250/227.24

[56]  References Cited

U.S. PATENT DOCUMENTS

| | | | |
|---|---|---|---|
| 4,394,060 | 7/1983 | Verber et al. | 385/7 |
| 4,425,023 | 1/1984 | Mataumoto et al. | 350/96.14 |
| 4,453,801 | 6/1984 | Verber et al. | 385/130 |
| 4,470,661 | 9/1984 | Matsumoto | 385/7 |
| 4,762,383 | 8/1988 | Yamashita et al. | 385/7 |
| 4,797,867 | 1/1989 | Sunagawa et al. | 369/45 |

FOREIGN PATENT DOCUMENTS 3205868  2/1982  Fed. Rep. of Germany .

OTHER PUBLICATIONS

J. Phys. D:Appl. Phys., vol. 10, 1977, GB, pp. 1833–18451 F. R. Geelier: "A coliner thin-film acousto-optic scanner".
ICCC/ICICE Global Telecommunications Conference vol. 2, Nov. 15, 1987, pp. 1305–1390; Tokyo, JP; N. Gotto et al.: "Wavelength-multiplexed optical switching system using acousto-optic switches".
European Search Reprot EP 90 91 0990.

*Primary Examiner*—Akm E. Ullah
*Attorney, Agent, or Firm*—Donald M. Boles

[57]  ABSTRACT

Electro-optical Scanner comprising an optical waveguide (41) and an acoustic waveguide (42), arranged on a transparent substrate (40) and being colinear with respect to each other, for deflecting light waves out from the optical waveguide (41) by colinear acousto-optic interaction of the light waves (44) with a short surface acoustic wave traveling diffraction grating (43) propagating in the acoustic waveguide (42). The short traveling diffraction grating (43) is generated by a wide band transducer. Different applications of the electro-optical scanner are possible.

16 Claims, 7 Drawing Sheets

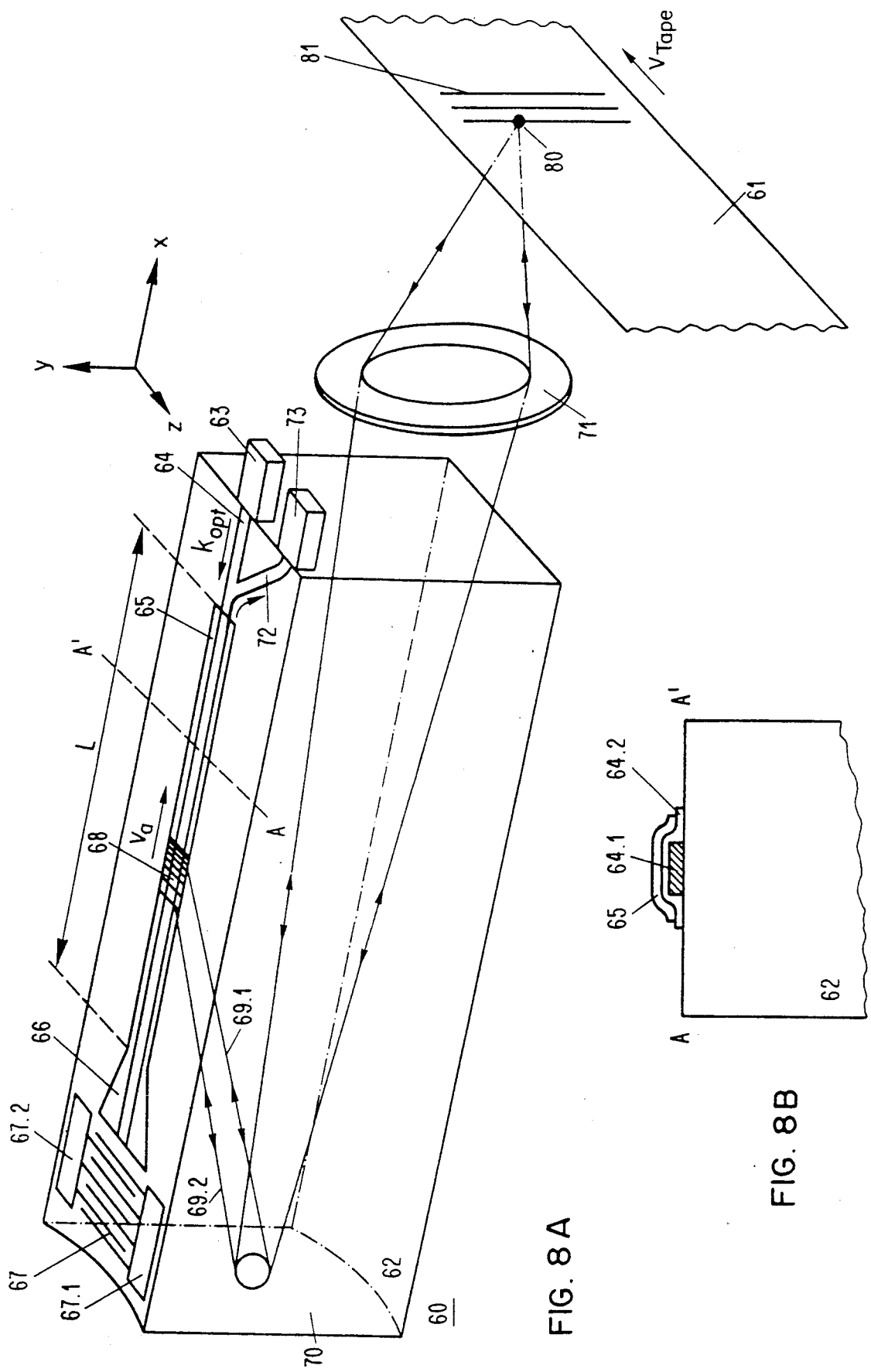

ELECTRO-OPTICAL SCANNER

TECHNICAL FIELD

The invention relates to an optical scanning device for deflecting light waves, or portions thereof, sharing a common optical waveguide, out from this waveguide into the substrate of the device, and/or for coupling light waves applied via the substrate of the device into the common optical waveguide. The scanning mechanism consists of a short surface acoustic wave traveling diffraction grating propagating in an acoustic waveguide such that colinear acousto-optic interaction with a light wave deflects the light wave out of the common waveguide or couples it back thereto.

BACKGROUND OF THE INVENTION

With increasing automatic control in various technical fields, optical scanners have found a plurality of different applications. Optical scanners are being used in areas such as optical storage, optical data communication, optical measuring tools, and laser printing.

As of today commonly used are bulky mechanical scanning systems employing a single laser or a laser array moved by an electro-magnetic mechanism.

Efforts aiming at improved performance requiring optical scanning systems without mechanical elements and the great demand for further miniaturization, have led to the design of scanning devices using acousto-optic interaction. In these scanning devices a surface acoustic wave (SAW) interacts with an incident light beam and deflects it out of its propagation direction. Two different types of acousto-optic interaction can be employed to deflect a light beam out of its original direction.

Most of the devices known in the art employ scanning mechanisms based on the acousto-optic Bragg interaction, schematically shown in FIG. 1. In these systems an incident light wave 10 (wavevector $k_{opt}$), guided in an optical waveguide layer 11, interacts with an acoustic surface wave 12 (wavevector $k_a$), as illustrated in FIG. 1. The surface acoustic wave generates periodic ondolations 13 at the waveguide surface and induces a periodic variation in the index of refraction of the surface and the area below by photo-elastic effects. Incident guided optical waves 10, as they interact with the region of induced fluctuation in the index of refraction, will be diffracted provided that proper phase matching conditions exist. The deflected light wave 14 (wavevector $k_s$), propagates in the plane unfolded by the vectors $k_{opt}$ and $k_a$. The angle $alp_B$ of deflection within the x-z plane is very small and the resolution is low. A portion 15 of the incident light wave 10 proceeds straight through the travellng grating reducing the intensity of deflected wave 14.

A detailed description of a deflector using acousto-optic Bragg interaction is given in "Thin Film Acoustooptic Devices", Proc. IEEE, Vol 64, pp. 779, 1976, published by G. Lean et. al.

Different patents, two of them are listed below, relate to optical pickup heads, using acousto-optic Bragg interaction for the lateral correction of tracking-errors:

U.S. Pat. No. 4,797,867, "Pick-up Head For Optical Information Storage Disk", and U.S. Pat. No. 4,425,023, "Beam Spot Scanning Device".

The fact that the Bragg diffraction condition has to be satisfied limits the angle of deflection. In addition it is not possible to reduce the 0-th order diffracted light portion 15, which goes straight on, as shown in FIG. 1.

Another kind of acousto-optic interaction is the colinear interaction. As shown in FIG. 2 and FIG. 3, an optical light wave 20 (wavevector $k_{opt}$), propagating in a waveguide layer 21, interacts with a colinear surface acoustic wave 22 (wavevector $k_a$) deflecting light wave 20 out of the x-z plane into a substrate 23. The deflection angle $&alp._c$, between light wave 20 ($k_{opt}$) and deflected light wave 24 ($k_s$), of the colinear interaction system is bigger than $alp_B$ of a Bragg interaction system, due to the increased bandwidth of the acoustic wavelength $\lambda$ in contrast to the bandwidth of Bragg interaction systems.

Experimental demonstrations of the colinear acousto-optic interaction were first reported by Kuhn et. al., "Optical guided wave mode conversion by an acoustic surface wave", Appl. Phys. Lett., Vol. 19, pp. 428–430, 1971.

Additional experimental results, published by F. Gfeller, "A colinear thin-film acousto-optic scanner", J. Phys. D: Appl. Phys., Vol. 10, pp. 1833–1845, 1977, relate to systems schematically shown in FIG. 4 of the present application, involving a glass film 31 and a quartz substrate 35. This article, and particulary FIG. 8 thereof, is the nearest prior art known to the applicant and describes devices operating in the continuous wave-mode (CW-mode) such that the whole interaction path of length L is filled with an acoustic wave 32 (wavevector $k_a$) of constant frequency as shown in FIG. 4. Light wave 30 (wavevector $k_{opt}$) interacts with the SAW 33 over length L which is generated from a transducer 36. The angle $alp_{cw}$ depends on the wavelength $\lambda$ of the SAW 33. Controlling the shape of the deflected wave, represented by the parallel outer rays 34.1 and 34.2 in FIG. 4, is not possible because the device is operated in CW-mode. The optical resolution of devices operating in the CW-mode is limited since the light wave interacts with a "grating" having the length of the whole interaction path. The deflected beams are not forming single circular spots but smeared lines.

Hithereto it has not been shown how the shape of a deflected light wave can be controlled without expensive external lenses and optics, and how to reduce stray beams if a light wave from outside of the device is coupled into the device.

SUMMARY OF THE INVENTION

It is a main object of the present invention to provide an electro-optical scanning device with high scanning rate such that, e.g., short light pulses fed via a high speed fibre to the scanning device can be processed.

Another main object of the present invention is to provide a scanning mechanism usable in both directions for deflecting an incident light wave out of the device and/or for coupling light from outside into the device.

Other objects are to provide scanning devices with high optical resolution, to reduce side-lobes of the deflected light waves and to control the aperture of the deflected light wave.

The invention as claimed is intended to meet these objectives and to remedy the remaining deficiencies of known scanning devices. In the inventive scanning device this is accomplished in that the incident light wave is deflected by colinear interaction with a surface acoustic wave forming a short SAW traveling diffraction grating propagating in an acoustic waveguide colinear to the incident light wave. The optical resolution of the device is increased by the employment of parallel optic- and acoustic-waveguides and these short SAW traveling diffraction gratings. Special shapes of the short SAW traveling diffraction gratings make it possible to control the cross-section and aperture of the deflected beam. In addition it is possible to reduce the side lobes of the deflected light wave using such a short SAW grating.

The main advantage offered by the invention is that the special combination of optic- and acoustic-waveguides allows to control the shape of the deflected light wave by changing the shape of the "short traveling diffraction grating". The shape of this grating is mainly determined by the driver signal which generates the SAW. When the scanner is used in reverse direction, only a small bundle of rays, not stray beams thereof, is coupled back into the device. The high selectivity with respect to light waves which have to be coupled back improves the resolution of the device. Alternating or simultaneous use of both directions of the device is possible.

A further advantage of the employment of short traveling gratings is that it improves the scanning rate, which is important for applications used for optical data communications such as fast optical multiple-way switches.

DESCRIPTION OF THE DRAWINGS

Different ways of implementing the invention are described in detail below with reference to drawings which illustrate specific embodiments and in which

FIG. 8A is a schematic view of a first embodiment of the electro-optical scanning device.

FIG. 8B is a cross-section of a first embodiment of the electro-optical scanning device, cut along line A—A'.

DETAILED DESCRIPTION

Figure 1:
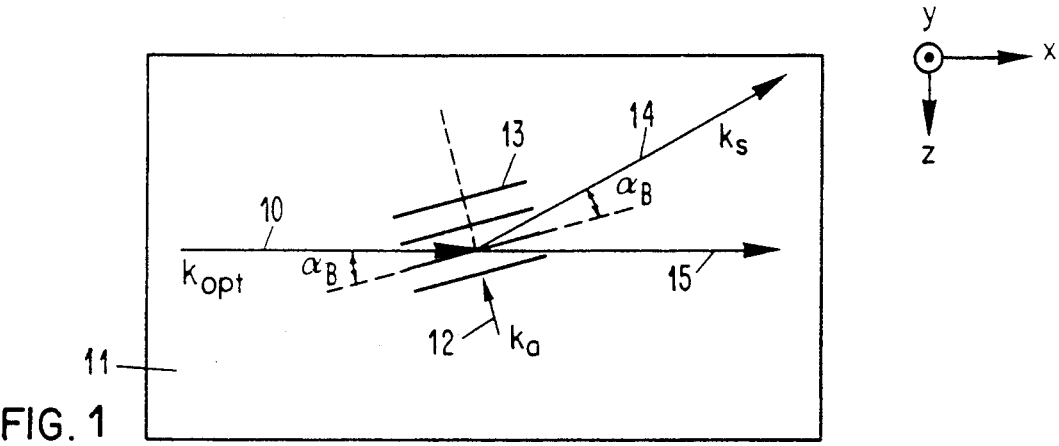
FIG. 1 is a schematic top view of a acousto-optic Bragg interaction scanning device.
Figure 2:
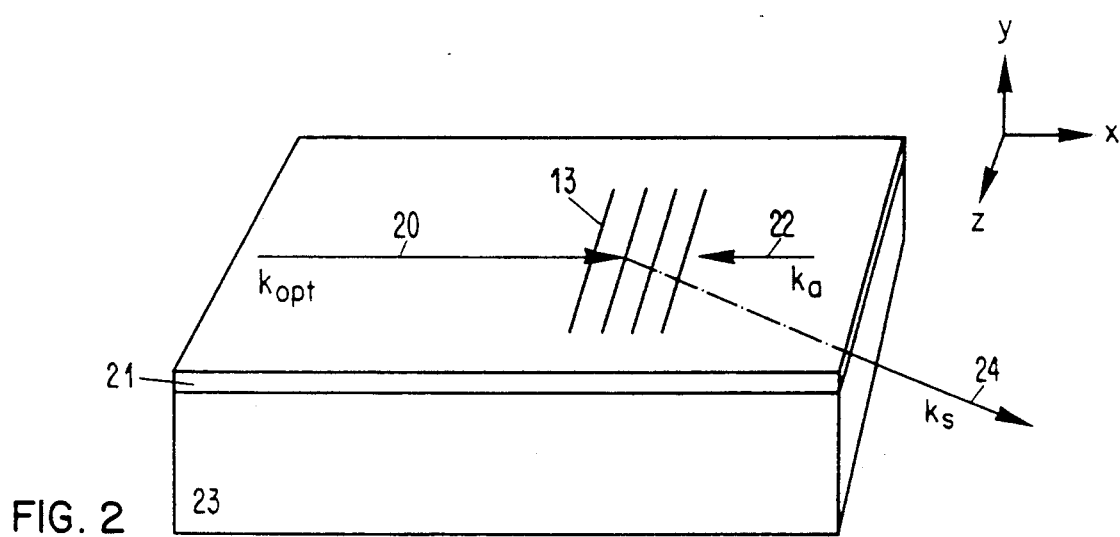
FIG. 2 is a schematic illustration of a colinear acousto-optic interaction scanning device.
Figure 3:
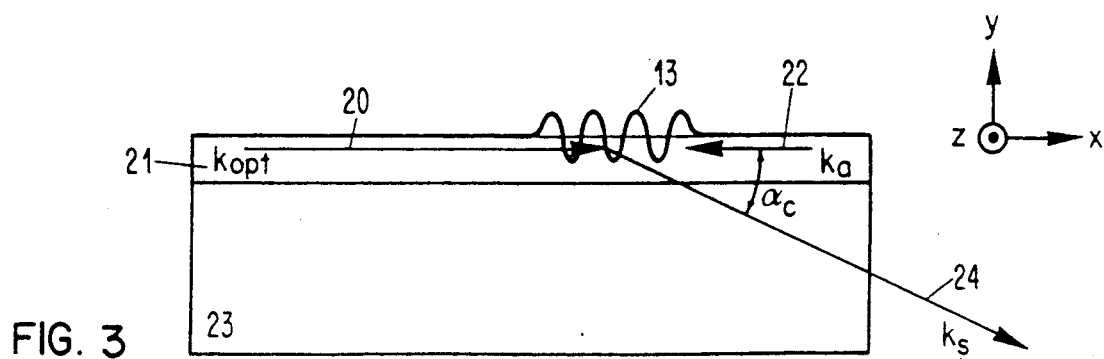
FIG. 3 is a schematic longitudinal cross-section of the device illustrated in FIG. 2.
Figure 4:
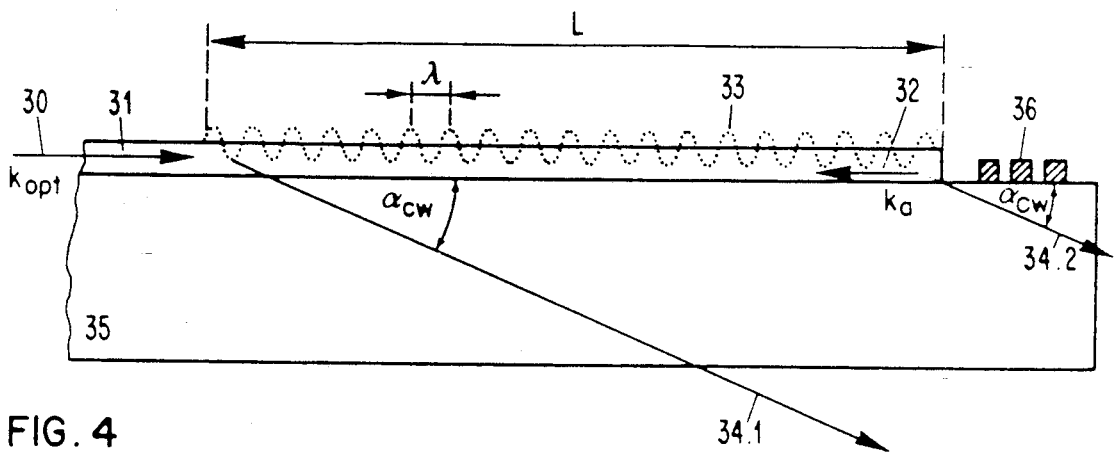
FIG. 4 is a schematic longitudinal cross-section of a colinear acousto-optic interaction device operating in the continous wave-mode.
Figure 5:
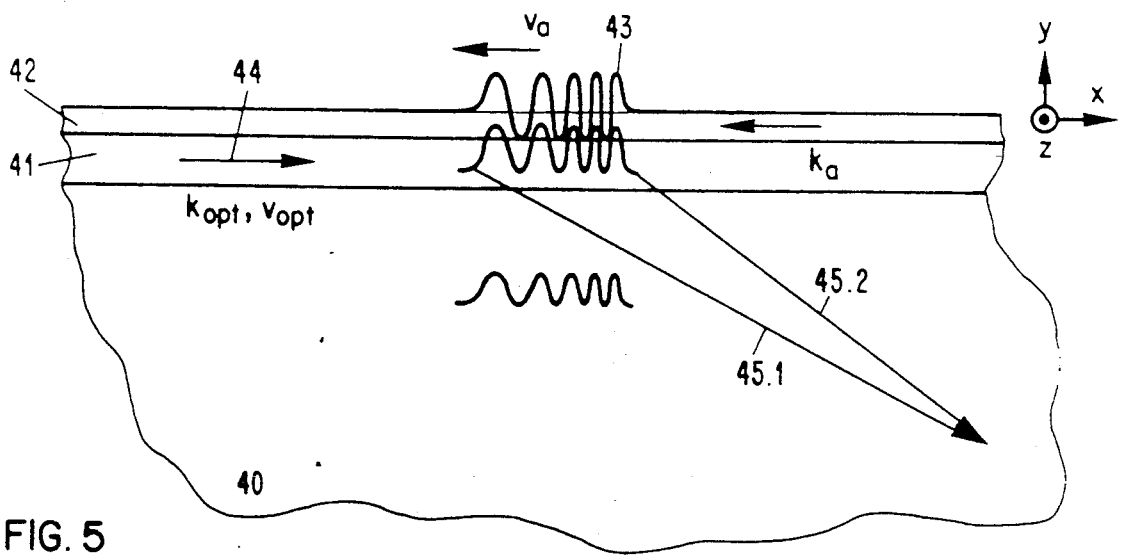
FIG. 5 is a schematic sketch of a focusing scanning device showing colinear acousto-optic interaction of a guided optical wave with a short traveling diffraction grating.
Figure 6:
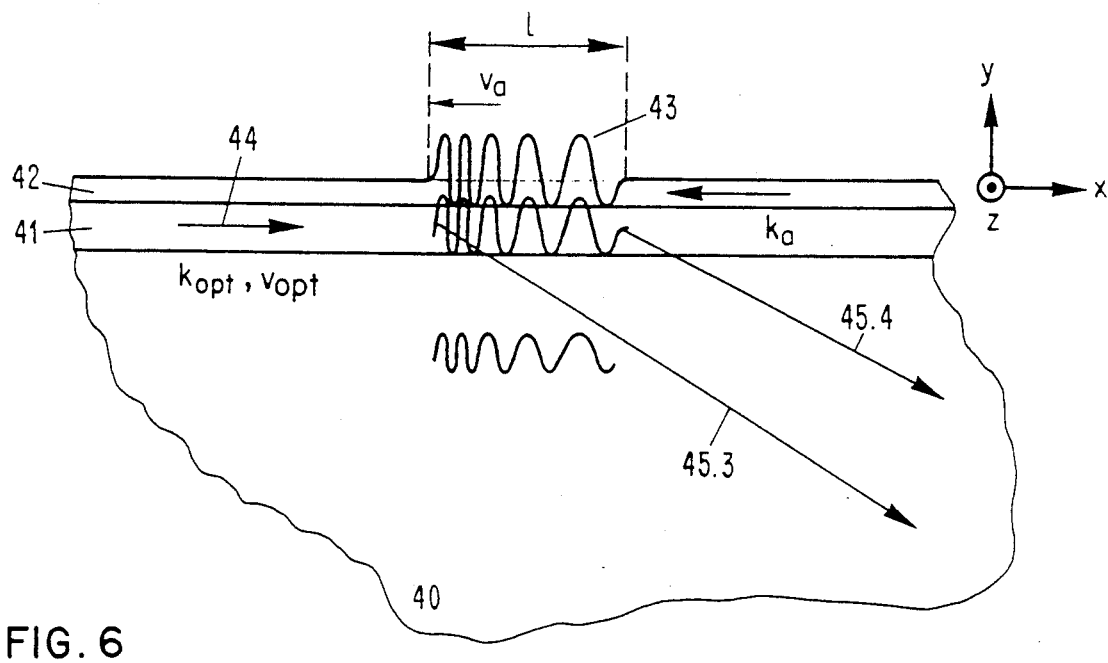
FIG. 6 is a schematic sketch of a scanning device showing colinear acousto-optic interaction of a guided optical wave with a short traveling diffraction grating such that the deflected light wave has a defined aperture.

Before describing an embodiment of the inventive electro-optical scanning device in greater detail, the colinear acousto-optic interaction of a light wave with a short focusing SAW traveling diffraction grating will be outlined with the aid of FIG. 5 and FIG. 6.

FIG. 5 and FIG. 6 are cross-sectional views of an optical scanning device build on a transparent substrate 40. An optical waveguide 41 in combination with an acoustic waveguide 42 are formed on top of the substrate 40. The employment of these waveguides, in comparison with simpler systems, leads to higher power densities and hence efficient interaction with small input powers. Moreover, a guided wave can be confined over long distances so that diffraction is avoided and long interaction lengths can be acheived.

A transducer, not shown, fed with a frequency modulated transducer driver signal ($SAW_D$) issues a short frequency modulated SAW traveling diffraction grating. As illustrated in FIG. 5, grating 43 travels parallel to the negative x-axis and interacts with an optical light wave 44 (wavevector $k_{opt}$). The amplitude of disorder introduced by the SAW into acoustic waveguide 42 and "carried over" into the optical waveguide 41 decreases exponentially with depth of penetration. The fact that SAW penetrates the acoustic- and optical waveguides and the substrate below is illustrated by the parallel waves of decreasing amplitude and thickness of the lines. The deflected light wave, represented by outer rays 45.1 and 45.2, is focused into the substrate 40. In FIG. 6 a SAW grating 43.1 propagates along the negative x-axis. The light wave 44.1 (wavevector $v_{opt}$) reaches grating 43.1 from the side with higher frequency and is deflected with a defined aperture into the substrate 40. The deflected wave is now illustrated by the outer rays 45.3 and 45.4. The velocity $v_a$ of typical traveling diffraction gratings are negligible small in contrast to the velocity of light $v_{opt}$ in the waveguide material and can be treated and calculated as stationary diffraction gratings.

The shape of the deflected light wave is determined by the short traveling diffraction grating which can be affected and controlled by the SAW transducer driver signal. The short traveling diffraction grating is also influenced by form and type of the employed transducer.

Figures 7A, 7B:
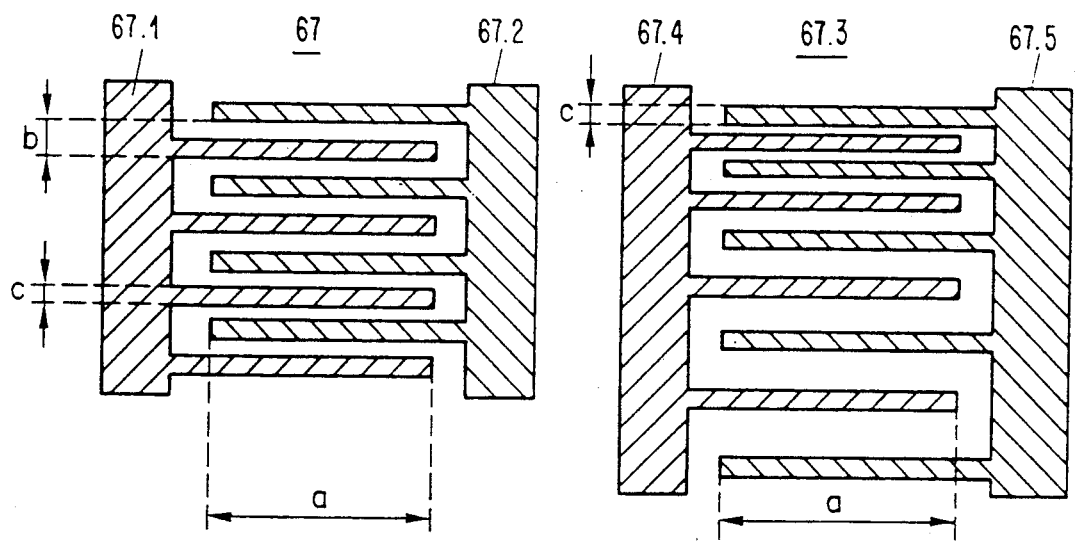
FIG. 7A is a schematic top view of a wide band transducer.
FIG. 7B is a schematic top view of a wide band transducer with increasing finger periodicity.

Two typical transducers are illustrated in FIG. 7A and FIG. 7B. FIG. 7A shows a wide band transducer 67, formed on a $LiNbO_3$ substrate, with two electrodes 67.1 and 67.2 each of them having four fingers. The distance b between these fingers and the thickness c thereof is constant. The bandwidth of a SAW generated by transducer 67 has a center frequency $f_0$. The frequency components of a SAW are limited at $f_0$ & plm. 25%. The aperture a of transducer 67 has to be adapted to an acoustic waveguide 65 or horn feed 66. FIG. 7B shows a wide band transducer with increasing finger periodicity. The finger thickness is constant. The periodicity of the fingers of the electrodes 67.4 and 67.5 improves the bandwidth of the transducer 67.3. Further information relating to transducers, surface acoustic waves, and waveguides can be taken from the books "Acoustic Fields And Waves In Solids", Vol. I and II, of B. A Auld, John Wiley & Sons, 1973.

The side lobes of the deflected light waves can be reduced by the employment a of amplitude modulated traveling diffraction grating and the aperture of the deflected wave depends on the frequency modulation of this grating and of the length I of the grating, see FIG. 6.

In context with a first embodiment herein described, a detailed block diagram of a driver and control circuitry will be described suitable for generating a frequency and amplitude modulated SAW traveling diffraction grating.

A first embodiment of the present invention is illustrated in FIG. 8A which shows an optical electro-optical scanning device 60 capable of writing and reading of data stored on an optical tape 61.

The device is built on a transparent piezoelectric $LiNbO_3$ (or Quartz) substrate 62. A laser 63, fixed at one end of the scanning device 60, is optically coupled to an optical waveguide 64 such that light waves $k_{opt}$ emitted from laser 63 are propagating along waveguide 64 paralled to the -x direction. An acoustic waveguide 65, formed on top of the optical waveguide 64, is connected via horn feed 66 to a surface acoustic wave wide-band transducer 67 (SAW-transducer) formed on the substrate 62. Horn feed 66 and acoustic waveguide 65 consist of a thin metal film loading the surface and thus reducing the acoustic propagation speed $v_a$ of the surface acoustic waves to provide lateral confinement of the acoustic waveguide 65. The horn feed 66 serves to compress the lateral (z) dimension of the SAW and causes a higher acoustic power density and thus a higher efficiency of the SAW's. FIG. 8B shows a detailed cross-section of the waveguide structure described above. The optical waveguide 64 consists of a waveguide core 64.1 and an optical cladding 64.2. The acoustic waveguide 65, formed by a metal layer, is arranged on the top of the optical cladding 64.2 such that the optical cladding 64.2 is short-circuited thus eliminating the electrical field at the interface between cladding 64.2 and metal layer 65 and reducing the acoustic propagation speed.

Figure 9:
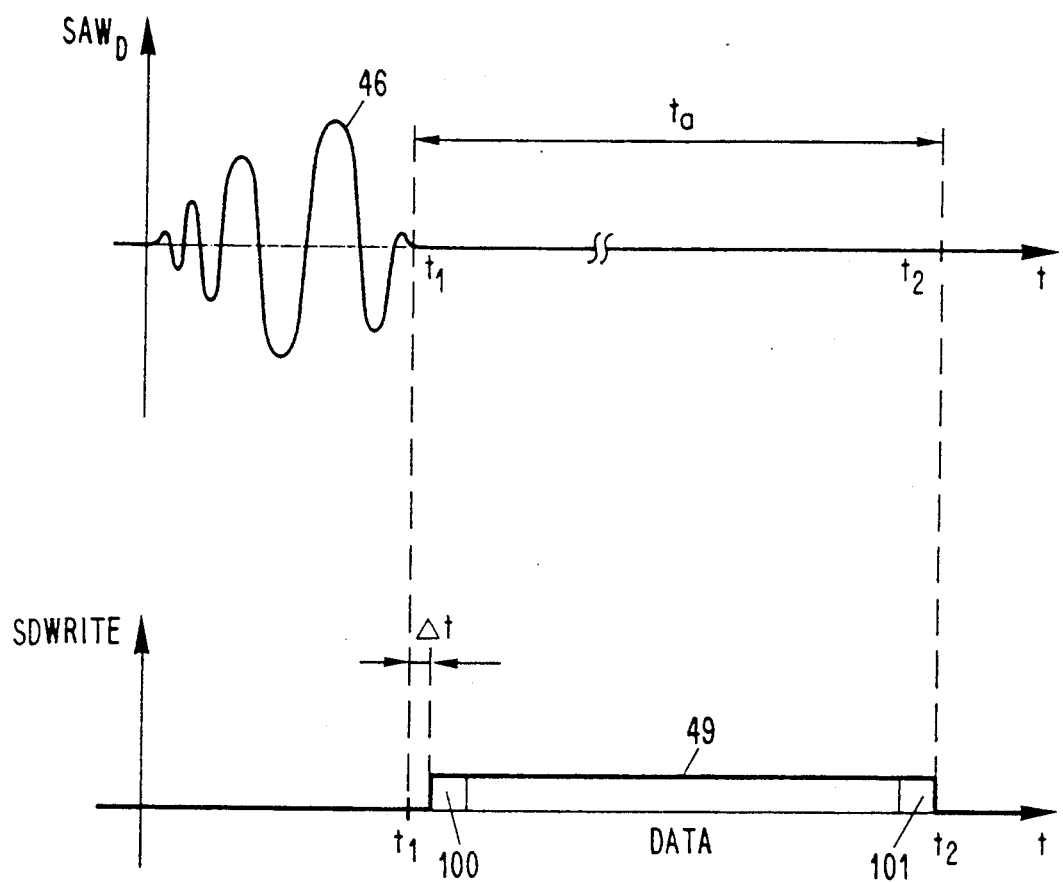
FIG. 9 is a signal/time diagram for track writing.

The wide band SAW-transducer 67, which is detailed illustrated in FIG. 7A, generates short frequency- and amplitude-modulated SAW traveling diffraction grating 68 having a shape similar to that of the driver signal 46 shown in FIG. 9 and propagating with velocity $v_a$ through the waveguide 65 when an electric driver signal 46 is fed to the interdigitated electrodes 67.1 and 67.2 of transducer 67. A SAW traveling along the acoustic waveguide 65 generates periodic ondolations 68 at the surface thus inducing periodic variation in the index of refraction similar to a stationary grating. The amplitude of the disorder and the induced variations in the index of refraction decreases exponentially with the depth of penetration into the optical waveguide 64 and the substrate 62. When the light wave (wavevector $k_{opt}$) meets the traveling diffraction grating 68, colinear acousto-optic interaction deflects the light wave into the substrate 62. The outer rays 69.1 and 69.2 of the deflected light wave are illustrated in FIG. 8A.

The aperture of the deflected light wave 69 in the x-y plane can be controlled by the frequency modulation of the SAW grating. The intensity distribution of deflected light wave 69 in the z-direction is approximately Gaussian due to the lateral intensity distribution of the guided optical wave $k_{opt}$ when interacting with an amplitude modulated SAW grating 68. The shape of the traveling grating 68 depends mainly on the driver signal 46 fed to the transducer electrodes 67.1 and 67.2.

A concave cylindrical mirror 70 (CCM) formed at one end facet of the substrate 62 serves to expand the z-dimension of the deflected light wave $k_s$ to the same aperture as in the y-direction. An external objective lens 71 focuses the light wave to a diffraction limited spot 80 on the surface of the tape medium 61 and provides an optical demagnification. By suitable synchronisation of the optical signals and the driver signals, accessing storage locations with high resolution and accuracy at parallel tracks 81 of tape 61 is possible.

A complete track record is written by modulating the laser diode 63 at high power with a serial write signal (SDWRITE) while a suitable SAW-pulse 68 generated by a transducer driver signal 46($SAW_D$), illustrated in FIG. 9, is propagating along waveguide 65. A typical signal-time diagram for writing data with the present device 60 is illustrated in FIG. 9. The SAW traveling diffraction grating 68 is fed to the acoustic waveguide 65 where it is propagating until it arrives at the end of waveguide 65. $t_1$ is the start time at which the whole traveling grating 68 has entered waveguide 65 and $t_2$ is the stop time when grating 68 arrives at the other end. The transit time $t_a$ is a function of the velocity $v_a$ of the SAW and the length L of waveguide 65 as given by equation (1):

$$t_a = v_a/L \qquad (1)$$

After a short retardation time dlct, a serial data stream 49 (SDWRITE) is fed to the optical waveguide 64. The SDWRITE signal 49 is limited by start- and stop-delimiters 100 and 101 as illustrated in FIG. 9.

For reading a track record, a SAW-pulse 68 is launched and laser diode 63 is operated at low power and continous wave mode (CW-mode), scanning the tape surface for recorded bit pattern having different reflectivity. Reflected portions of the scanning beam are coupled back into the optical waveguide 64 via objective lens 71, CCM 70, and traveling diffraction grating 68 and guided parallel to the x-direction via an optical coupler 72 to a photodiode 73 fixed near the laser 63. The output signal of the photodiode 73 represents the data stored on tape 61.

Figure 10:
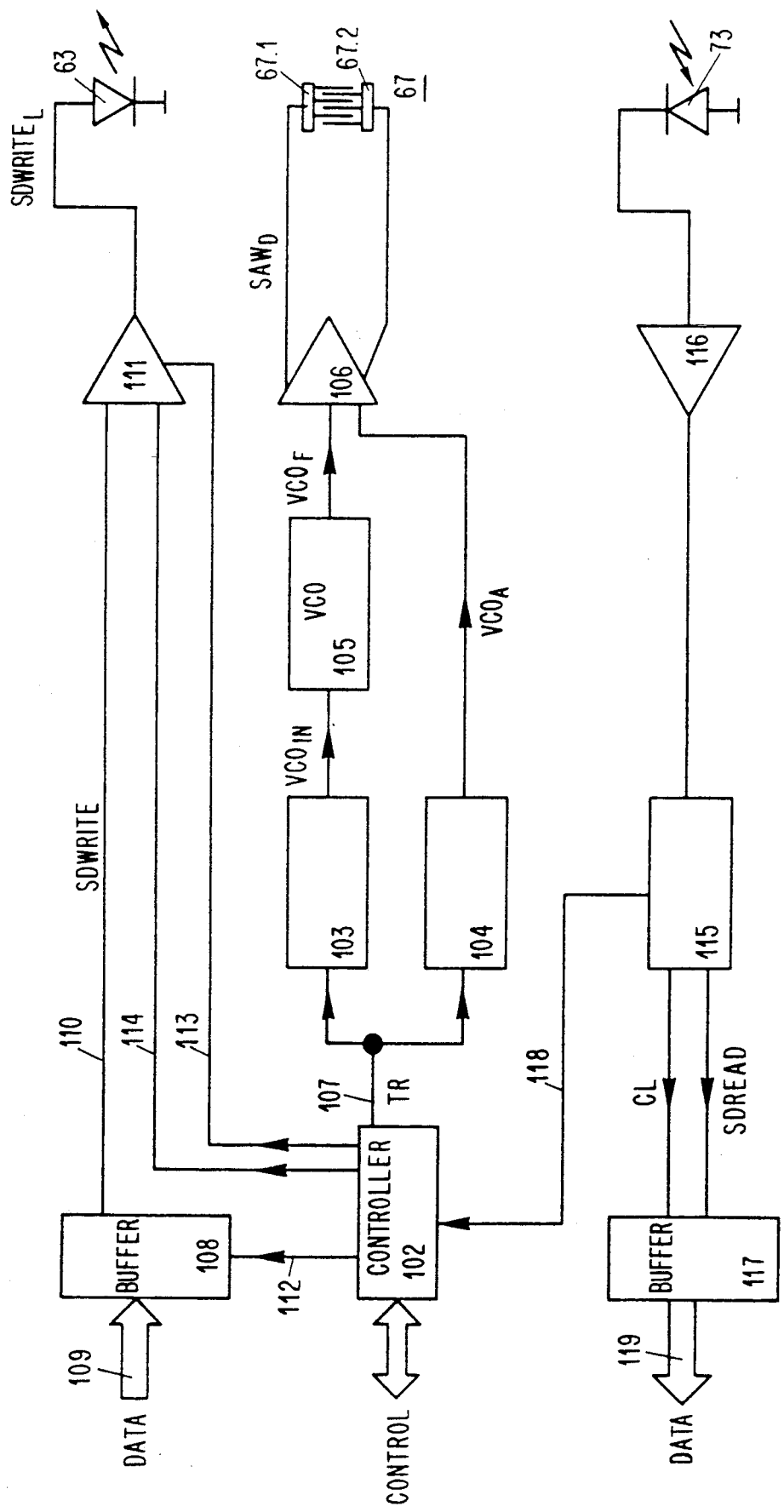
FIG. 10 is a schematic block diagram of the track read/write circuitry used.

A block diagram for track read and write is shown in FIG. 10. The transducer driver signal 46 ($SAW_D$) as illustrated in FIG. 9 is generated by multiplication of a frequency modulated signal $VCO_F$ with an amplitude controlled signal 48 ($VCO_A$) such that the driver signal 46 is frequency and amplitude modulated. A control circuit 102 emits a trigger pulse TR fed via connection 107 to a frequency waveform generator 103 and an amplitude waveform generator 104. The output signal 47 ($VCO_{IN}$) of waveform generator 103 is fed to a voltage controlled oscillator 105 (VCO) generating the frequency modulated $VCO_F$ signal. The signals $VCO_F$ and $VCO_A$ are fed to a SAW driver 106 generating the frequency and amplitude modulated output signal 46 $SAW_D$.

For writing data, a write buffer 108, connected to data port 109, emits a serial write signal 49 (SDWRITE) which is fed to laser diode 63 via laser driver 111 and connection 110. The laser diode transforms the serial data stream $SDWRITE_L$ into a pulsed optical output signal. The serial data stream is started as soon as the write buffer receives a control signal from controller 102 via connection 112. In addition, the controller is connected via connection 113 to laser driver 111 for laser power control.

For reading data, laser 63 is operated in CW-mode under control of controller 102 feding a CW-read signal via connection 114 to laser driver 111. Photodiode 73 receives the reflected beam portions representing the data stored and feds circuit 115 via preamplifier 116. Circuit 115 performs the functions of clock extraction and start/stop delimiter 100, 101 detection. Control signals are sent to controller 102 via connection 118 and the clock- (CL) and serial read signals (SDREAD) are fed to read buffer 117 which is connected to an output port 119.

Figure 11A:
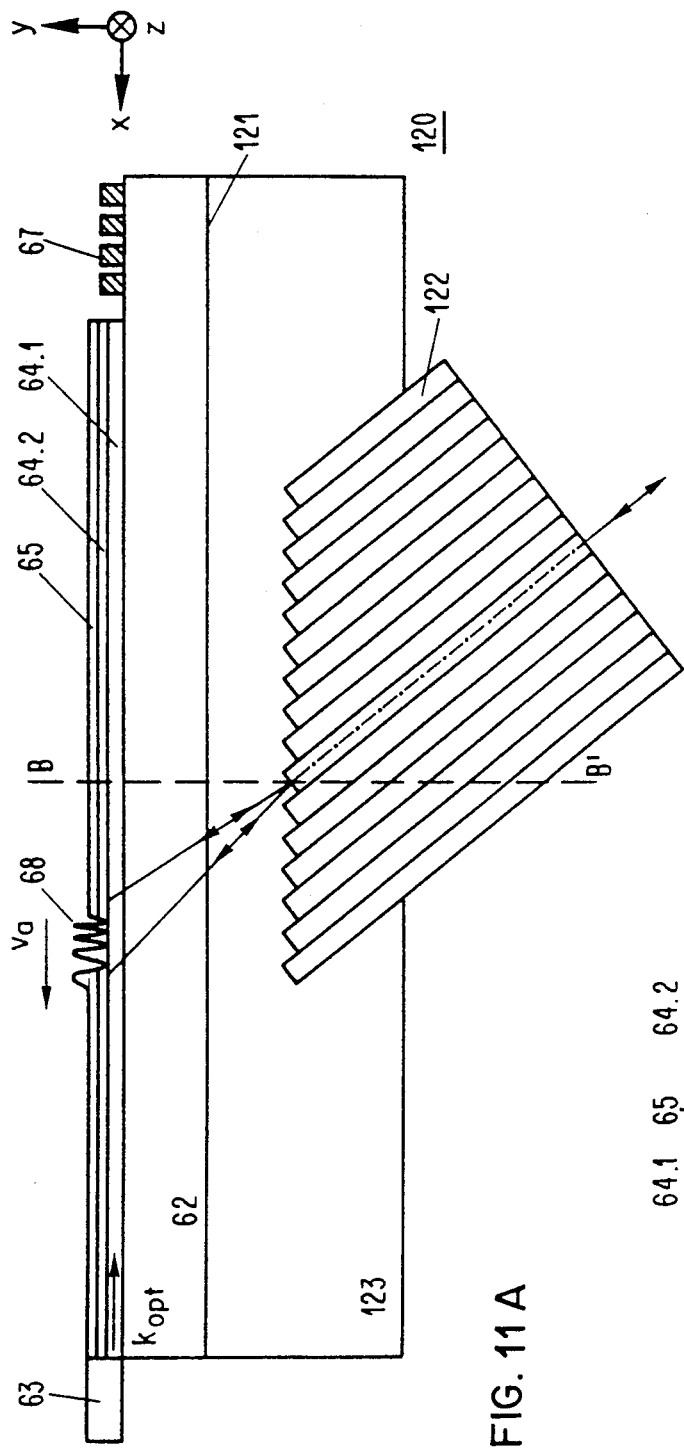
FIG. 11A is a schematic side view of a second embodiment.
Figure 11B:
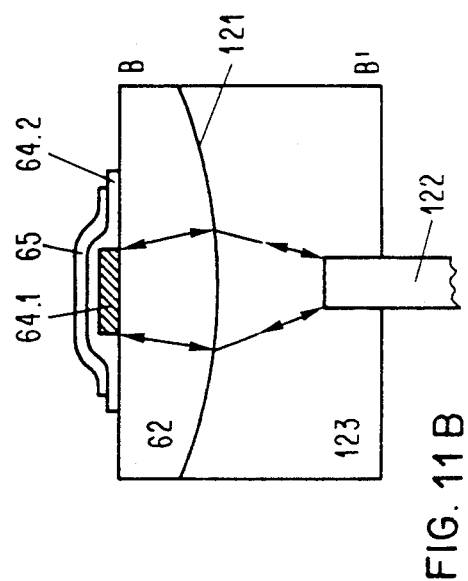
FIG. 11B is a cross-section of the second embodiment, cut along line B—B'.

Other embodiments of the present invention can be based on device 120 schematically illustrated in FIG. 11A and FIG. 11B. The construction of the waveguides 64, 65, transducer 67, and laser 63, respectively photodiode 73, are similar to that described in context with the first embodiment. In addition, a cylindrical mirror 121, unfolded in the x-z plane, is formed at the interface between substrate 62 with refractive index $n_1$ and fiber-embedding 123 with refractive index $n_2$. Contrary to the first embodiment, the SAW traveling diffraction grating deflects the light wave with wavevector $k_{opt}$ into the substrate 62 and focuses it in the x-y plane to the end facets of a fibre- or waveguide-array 122. The deflected light wave 96.1 and 69.2 is focused in the y-z plane by cylindrical lens 121.

Using this fundamental configuration, different applications of the scanning device 120 are concievable. Applications as optical line scanner, image writer, and optical Multiplexer/Demultiplexer are examples, each of them characterized in that different types of imaging optics, optical interfaces, photodiode arrays, laser arrays, external data processing and driver circuits have to be combined with the device 120.

In addition an optical serializer is conceivable requiring a laser diode array, one diode per channel, a fibre array guiding the light beams emitted by the diode array to a SAW traveling grating where the separate light beams are coupled into the common optical waveguide by acousto-optic interation.

As an alternative to the described embodiments, a piezoelectric ZnO film can be deposited on a non-piezoelectric dielectric substrate, thus increasing the choice of substrate materials with a refractive index slightly smaller than that of the optical waveguide core. Other changes are concievable for the configuration of the waveguides, laser, photodiode, and transducer, such that the present invention offers a wide variety of applications using the described scanning mechanism.

I claim:

1. Electro-optical scanner, comprising
a transparent substrate (62),
arranged on said substrate (62), an optical waveguide (64) and an acoustic waveguide (65), at least partly colinear and in an interactive relationship with respect to each other,
at least one opto-electronic device coupled to said optical waveguide (64) for feeding light waves into said optical waveguide (65), and/or for converting light waves received from said optical waveguide (64) into electric signals,
a transducer (67) for feeding, into said acoustic waveguide (65), acoustic waves which,
when interacting with light waves propagating in said optical waveguide (64), deflect the light at least partly out from the optical waveguide (64) into said transparent substrate (62), or,
when exposed to light waves applied from said transparent substrate (62), couple said light at least partly into said optical waveguide (64), and control circuitry for
causing said transducer (67) to feed an acoustic wave pattern, consisting of a limited, predetermined number of individual waves, into said acoustic waveguide (65), forming a short traveling diffraction grating (68) thereon, for
selectively controlling frequency and amplitude of said individual waves, and for
synchronizing said acoustic wave pattern on said acoustic waveguide (65) and said light waves reaching said acoustic wave pattern via said optical waveguide (64) or via said transparent substrate (62), so as to provide for proper interaction therebetween.

2. Electro-optical scanner as in claim 1, wherein said short traveling diffraction grating (68) is frequency modulated and/or amplitude modulated.

3. Electro-optical scanner as in claim 1 or claim 2, wherein said acoustic waveguide (65) consists of a metal film, formed on an optical cladding layer (64.2) which overlaps an optical waveguide core (64.1) said optical cladding layer (64.2) and said optical waveguide core (64.1) forming said optical waveguide (64).

4. Electro-optical scanner as in claim 3, wherein said acoustic waveguide (65) is coupled to a horn feed (66) consisting of a metal film for lateral compression of said acoustic wave pattern.

5. Electro-optical scanner as in claim 1, wherein said transparent substrate (62) is a piezoelectric material.

6. Electro-optical scanner as in claim 5, wherein said transparent piezoelectric substrate (62) is $LiNbO_3$ or Quartz.

7. Electro-optical scanner as in claim 1, wherein said transducer (67) has interdigitated metal electrodes (67.1, 67.2) formed on said substrate (62) and arranged such that an acoustic wave pattern launched by said transducer (67) is fed into said acoustic waveguide (65).

8. Electro-optical scanner as in claim 1, wherein two opto-electronic devices are coupled to said optical waveguide (64),
the first opto-electronic device being a laser (63) for feeding light waves into said optical waveguide (64), and
the second opto-electronic device being a photodiode (73) for transforming light waves, received via said optical waveguide (64), into electrical signals.

9. Storage system comprising an electro-optical scanner (60) as in claim 1, wherein said light (69.1, 69.2) which is deflected out from said optical waveguide (64), is applied to an optical storage medium for writing data onto and/or reading data from said optical storage medium.

10. Storage system as in claim 9, further comprising
a concave-cylindrical mirror (70) formed at one end facet of said substrate (62) of said electro-optical scanner (60),
an external lens (71)
arranged such that the concave-cylindrical mirror (70) adapts the aperture and intensity distribution of said deflected light (69.1, 69.2) to the external lens (71) which is demagnifying and focusing said deflected light onto said optical storage medium.

11. A method for generating a scanning light beam in a system comprising an optical waveguide (64) and an acoustic waveguide (65), arranged on a transparent substrate (62) and at least partly colinear and in an interactive relationship with respect to each other, comprising the steps of feeding an acoustic wave pattern, consisting of individual waves of selectively controlled frequency and amplitude, into said acoustic waveguide, forming a short traveling diffraction grating (68) thereon, and applying, in synchronism with said traveling diffraction grating (68), a sequence of light waves to said optical waveguide (64), such that, at the points of colinear interaction between said light waves and said diffraction grating (68), at least part of the light is deflected out from the optical waveguide (64) providing shaped scanning beams (69.1, 69.2) that can be projected to form either individual spots or a continuous line, depending on whether said light waves are applied to said optical waveguide (64) in a pulsed or continuous mode of operation.

12. A Method as in claim 11 wherein, said sequence of light waves, representing serial data to be stored, are projected onto a tape (61), such that the data are stored along tracks (81) of the tape (61).

13. A method for providing scanning light paths between a system comprising an optical waveguide (64) and an acoustic waveguide (65), arranged on a transparent substrate (62) and at least partly colinear and in an interactive relationship with respect to each other, and display means for displaying a light pattern, comprising the steps of applying a light pattern to said display means, and, in synchronism therewith, feeding an acousitc wave pattern, consisting of individual waves of selectively controlled frequency and amplitude, into said acoustic waveguide (65), forming a short traveling diffraction grating (68) thereon, such that light paths are provided sequentially for the light waves emitted from individual elements of the applied light pattern, whereby said light waves when impinging on said traveling diffraction grating (68) are, due to the interaction between the acoustic waveguide (65) and the optical waveguide (64), coupled into said optical waveguide (64).

14. A Method as in claim 13 for reading data stored on a tape (61), wherein said display means is a tape (61) on which the data are stored along tracks (81) having areas of different reflectivity forming said light pattern.

15. A Method as in claim 13 for serializing parallel optical data, wherein said display means is an array of fibres (122) feeding said parallel optical data, forming said light pattern, to said traveling diffraction grating (68), such that said individual elements of said applied light pattern are coupled serialized into said optical waveguide (64).

16. A Method as in claim 15 for serializing parallel optical data, wherein a photodiode array is coupled to said array of fibres (122), each of the photodiodes of said array of fibres (122) representing an individual element of said light pattern, such that the optical data emitted from said photodiodes are fed via said array of fibres (122) to said traveling diffraction grating (68).

* * * * *